(12) United States Patent
Grundmann et al.

(10) Patent No.: US 10,811,903 B1
(45) Date of Patent: Oct. 20, 2020

(54) ELECTROPERMANENT MAGNET SYSTEMS WITH WIRELESS POWER TRANSFER

(71) Applicant: X Development LLC, Mountian View, CA (US)

(72) Inventors: Michael Grundmann, Mountain View, CA (US); Jonathan Ross, Mountain View, CA (US); Joseph Sargent, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 947 days.

(21) Appl. No.: 15/393,714

(22) Filed: Dec. 29, 2016

(51) Int. Cl.
| | |
|---|---|
| *H01F 7/08* | (2006.01) |
| *H02J 50/10* | (2016.01) |
| *H02K 1/17* | (2006.01) |
| *H02K 1/34* | (2006.01) |
| *H02K 33/18* | (2006.01) |
| *H02J 5/00* | (2016.01) |
| *H01F 38/14* | (2006.01) |
| *H01F 7/06* | (2006.01) |
| *E05B 47/00* | (2006.01) |

(52) U.S. Cl.
CPC .......... *H02J 50/10* (2016.02); *E05B 47/0002* (2013.01); *H01F 7/064* (2013.01); *H01F 7/081* (2013.01); *H01F 38/14* (2013.01); *H02J 5/005* (2013.01); *H02K 1/17* (2013.01); *H02K 1/34* (2013.01); *H02K 33/18* (2013.01)

(58) Field of Classification Search
CPC .............. H02J 50/10; E05B 47/00–003; E05B 47/007; H01F 7/064; H01F 7/081
See application file for complete search history.

(56) References Cited

U.S. PATENT DOCUMENTS

| | | | |
|---|---|---|---|
| 4,758,813 A | 7/1988 | Holsinger et al. | |
| 6,646,529 B1 * | 11/2003 | Kahnert ............... | H01H 71/322 335/229 |
| 7,408,433 B1 * | 8/2008 | Irwin .................. | E05B 47/0002 335/228 |
| 2015/0102879 A1 | 4/2015 | Jacobs et al. | |
| 2017/0098336 A1 * | 4/2017 | Ady .................... | G08B 13/2491 |

OTHER PUBLICATIONS

Gilpin et al, "Robot Pebbles: One Centimeter Modules for Programmable matter through Self-Disassembly," in Robotics and Automation. IEEE International Conference, May 2010.
Knaian, Ara Nerses, "Electropermanent Magnetic Connectors and Actuators: Devices and Their Application in Programmable Matter," Department of Electrical Engineering and Computer Science. MIT, May 2010.

* cited by examiner

*Primary Examiner* — Ramon M Barrera
(74) *Attorney, Agent, or Firm* — Fish & Richardson P.C.

(57) ABSTRACT

Disclosed herein are various wireless power electropermanent magnets and related systems and devices, including handheld wands for activating and deactivating wireless power electropermanent magnets, and coupling and locking mechanisms utilizing wireless power electropermanent magnets.

14 Claims, 16 Drawing Sheets

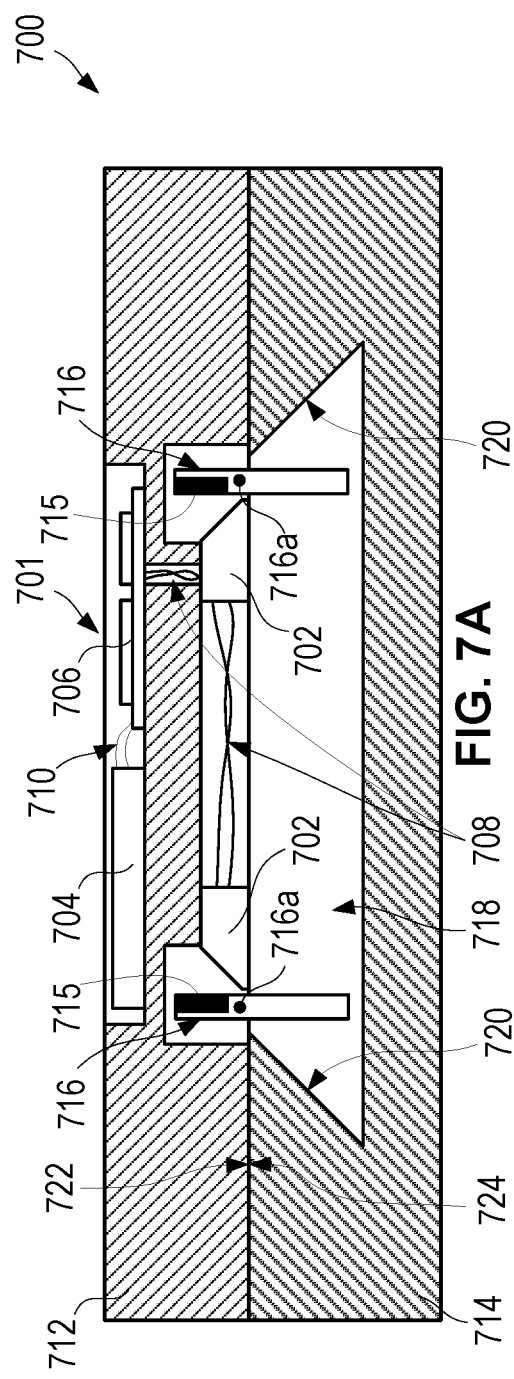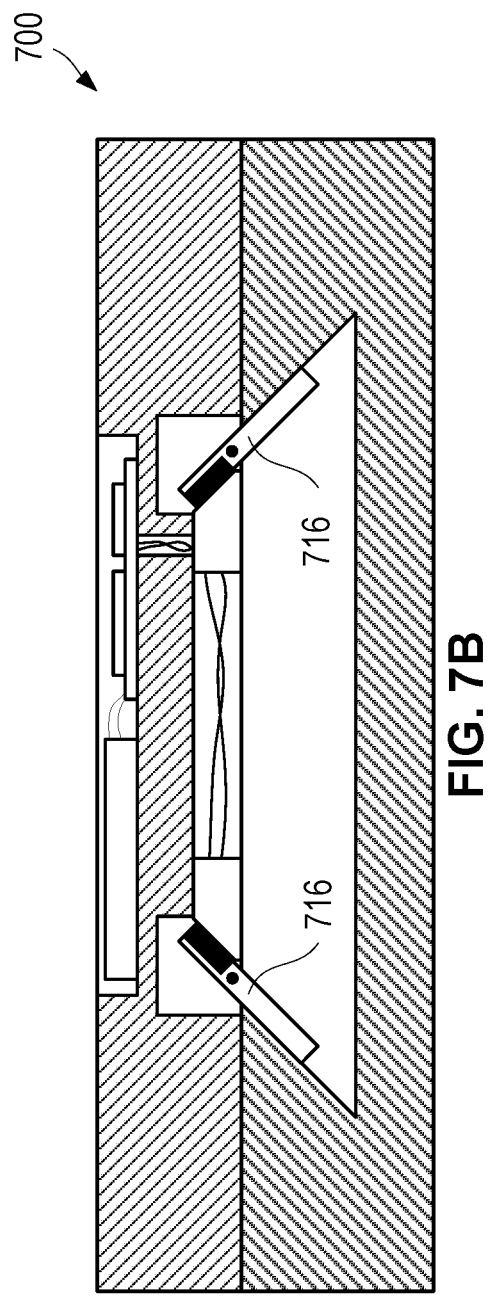

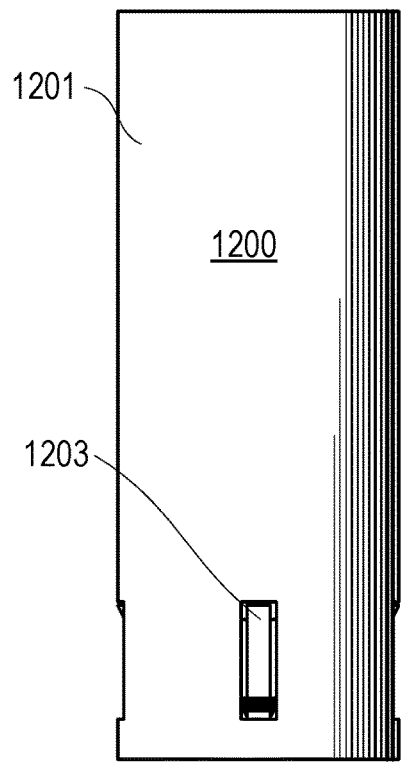
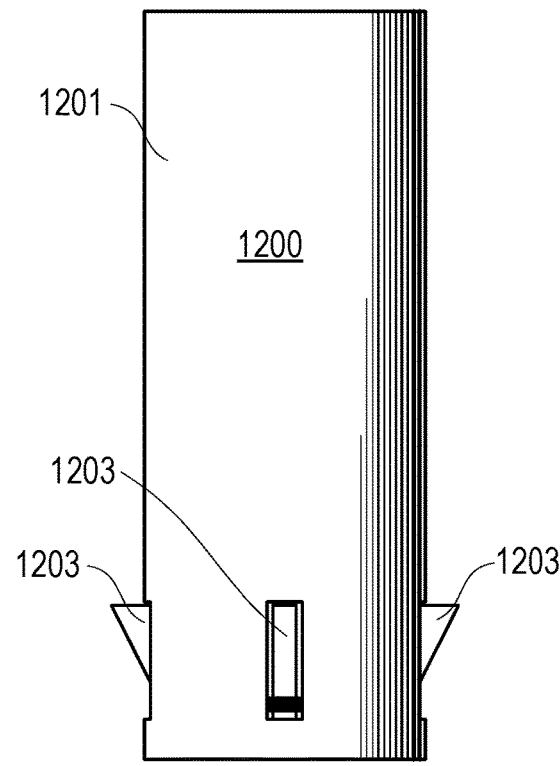
FIG. 12A
FIG. 13A
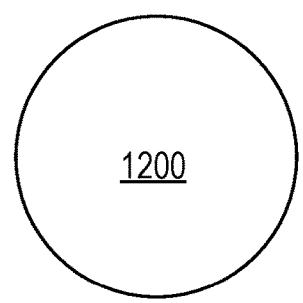
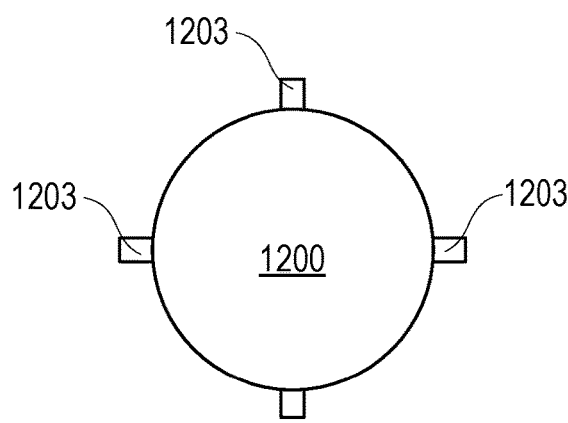
FIG. 12B
FIG. 13B

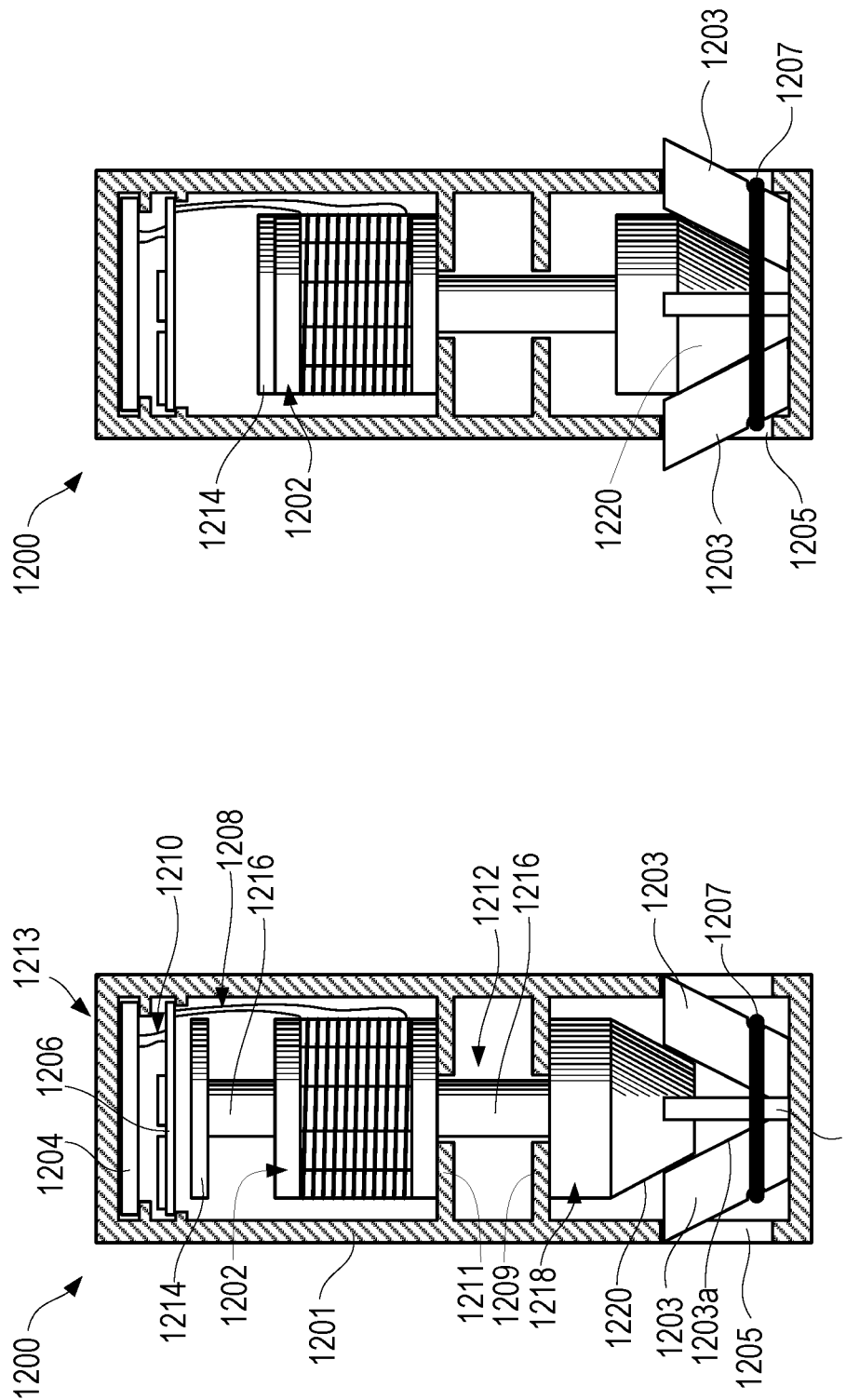

SECTION A-A

ELECTROPERMANENT MAGNET SYSTEMS WITH WIRELESS POWER TRANSFER

BACKGROUND

An electropermanent magnet ("EPM") has an external magnetic field that can switched on or off by an electrical pulse. The electrical pulse may change the magnet's state, but no electrical power is required to maintain the magnetic field. Electropermanent magnets may contain a hard (high coercivity) magnetic material and a soft (low coercivity) magnetic material. The two magnetic materials may be joined at both ends with a third material that has high magnetic permeability. At least the soft magnetic material may be wrapped with an electrical coil. A current pulse of one polarity, and of sufficient power and duration, may magnetize the soft magnetic material in a common direction with the hard magnetic material, resulting in an external flow of magnetic flux and effectively turning the electropermanent magnet "ON". A current pulse of the opposite polarity, and of sufficient power and duration, may reverse the magnetization of the soft magnetic material, while leaving the hard material unchanged. This may result in an internal flow of magnetic flux through the EPM, effectively turning "OFF" the electropermanent magnet.

SUMMARY

Example systems may include a wireless power receiver comprising an induction coil and a rectifier. The wireless power receiver may be configured to receive energy from a wireless power transmitter and output a unidirectional electric current. Example systems may further include an electropermanent magnet comprising a reversible magnet and an electrical coil wound around at least the reversible magnet. The electrical coil may be electrically coupled to the wireless power receiver and configured to receive power from the wireless power receiver sufficient to switch the magnetic state of the electropermanent magnet between an OFF state and an ON state.

Example handheld devices may include: a case comprising a handle configured to be held by a human hand; a power source; a wireless power transmitter comprising an induction coil and an oscillator, wherein the wireless power transmitter is configured to transmit energy to a wireless power receiver; and a switch configured to be operated by a human hand, wherein operation of the switch causes the wireless power transmitter to transmit energy.

In another aspect, example systems may include: a handheld device comprising a human-operable switch and a wireless power transmitter, wherein the handheld device is configured to transmit wireless power to a wireless power receiver upon activation of the human-operable switch; and an electropermanent magnet electrically coupled to the wireless power receiver and configured to receive power from the wireless power receiver sufficient to switch the magnetic state of the electropermanent magnet between an OFF state and an ON state.

Example coupling mechanisms may include: a receiver block comprising a recessed cavity and a magnetic target; and a locking block comprising a protrusion configured to fit within the recessed cavity, a wireless power receiver configured to receive energy from a wireless power transmitter, and an electropermanent magnet disposed within the protrusion and aligned with the magnetic target, wherein the electropermanent magnet is electrically coupled to the wireless power receiver and configured to receive power from the wireless power receiver sufficient to switch a magnetic state of the electropermanent magnet between an OFF state and an ON state, wherein the protrusion is fixedly coupled within the recessed cavity when the electropermanent magnet is in the ON state, and wherein the protrusion is removable from the recessed cavity when the electropermanent magnet is in the OFF state.

In another aspect, example coupling mechanisms may include: a receiver block comprising a top mating surface and a recessed cavity, wherein a side surface of the recessed cavity includes an undercut portion; and a locking block comprising a bottom mating surface, a rotatable latch comprising a magnetic target, wherein the rotatable latch is configured to rotate between a first position extending into the recessed cavity and allowing the bottom mating surface of the locking block to be removably placed against the top mating surface of the receiver block and a second position wherein the latch is adjacent to the undercut portion of the recessed cavity and fixes the locking block to the receiving block, a wireless power receiver configured to receive energy from a wireless power transmitter, and an electropermanent magnet, wherein the electropermanent magnet is electrically coupled to the wireless power receiver and configured to receive power from the wireless power receiver sufficient to switch a magnetic state of the electropermanent magnet between an OFF state and an ON state, wherein in the ON state the electropermanent magnet attracts the magnetic target, orienting the rotatable latch in the second position, and wherein in the OFF state the electropermanent magnet does not attract the magnetic target and allows the rotatable latch to orient in the first position.

Example tubular electropermanent magnets may include: one or more magnet pairs arranged substantially adjacent and parallel to each other and around a closed curvilinear space to define a bore and central longitudinal axis therein, wherein each magnet pair is comprised of a magnetically hard magnet and a magnetically soft magnet; a magnetically permeable annular ring disposed at each longitudinal end of the one or more magnet pairs; and an electrical coil configured to switch the magnetic poles of each magnetically soft magnet when the electrical coil is energized and not switch the magnetic poles of each magnetically hard magnet when the electrical coil is energized.

Example wireless power locking pin systems may include: a locking pin, wherein the locking pin comprises a case, an electropermanent magnet electrically coupled to a wireless power receiver and configured to receive power from the wireless power receiver sufficient to switch the magnetic state of the electropermanent magnet between a first state and a second state, and an engagement pin contained within the case and configured to extend at least partially outside the case when the electropermanent magnet is switched from the first state to the second state.

In another aspect, example wireless power locking pin systems may include: a locking pin case; a plunger comprising a magnetic target, an actuator comprising a first inclined surface, and a shaft coupling the magnetic target to the actuator; an engagement pin comprising a second inclined surface oriented to engage with the first inclined surface of the actuator, wherein the engagement pin is configured to move between a first position within the case and a second position wherein at least a portion of the engagement pin extends outside the case; a wireless power receiver, wherein the wireless power receiver is configured to receive energy from a wireless power transmitter and output a unidirectional electric current; and an electropermanent magnet electrically coupled to the wireless power receiver and configured to receive power from the wireless power receiver sufficient to switch the magnetic state of the electropermanent magnet between an OFF state and an ON state, wherein in the ON state the electropermanent magnet attracts the magnetic target, causing the first inclined surface of the actuator to slide along the second inclined surface of the engagement pin and move the first engagement pin from the first position to the second position.

In another aspect, example wireless power locking pin systems may include: a locking pin case; a rotating actuator comprising a magnetic target; an engagement pin coupled to the rotating actuator, wherein the engagement pin is configured to move between a first position within the case and a second position wherein at least a portion of the first engagement pin extends outside the case; a wireless power receiver, wherein the wireless power receiver is configured to receive energy from a wireless power transmitter and output a unidirectional electric current; and an electropermanent magnet electrically coupled to the wireless power receiver and configured to receive power from the wireless power receiver sufficient to switch the magnetic state of the electropermanent magnet between an OFF state and an ON state, wherein in the ON state the electropermanent magnet attracts the magnetic target, causing the rotating actuator to rotate and move the engagement pin from the first position to the second position.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 7A illustrates a cutaway side view of an alternative configuration for a wireless power EPM coupling mechanism in an uncoupled state, in accordance with an example implementation.

FIG. 7B illustrates a cutaway side view of the alternative wireless power EPM coupling mechanism of FIG. 7A in a coupled state, in accordance with an example implementation.

FIG. 12A illustrates a side view of a wireless power EPM locking pin in a retracted state, in accordance with an example implementation.

FIG. 12B illustrates a top view of the wireless power EPM locking pin of FIG. 12A, in accordance with an example implementation.

FIG. 13A illustrates a side view of a wireless power EPM locking pin in an extended state, in accordance with an example implementation.

FIG. 13B illustrates a top view of the wireless power EPM locking pin of FIG. 13A, in accordance with an example implementation.

FIG. 16 illustrates a side cutaway view of a wireless power EPM locking pin in a retracted state, in accordance with an example implementation.

FIG. 17 illustrates a side cutaway view of a wireless power EPM locking pin in an extended state, in accordance with an example implementation.

DETAILED DESCRIPTION

The following detailed description describes various features and functions of the disclosed systems and devices with reference to the accompanying figures. The illustrative embodiments described herein are not meant to be limiting. It may be readily understood that certain aspects of the disclosed systems and devices can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

The term "substantially" means that the recited characteristic, parameter, or value need not be achieved exactly, but that deviations or variations, including for example, tolerances, hysteresis, measurement error, measurement accuracy limitations, and other factors known to skill in the art, may occur in amounts that do not preclude the effect the characteristic was intended to provide.

I. Overview

Disclosed herein are electropermanent magnets and systems that use electropermanent magnets coupled to wireless power transfer systems, including electropermanent magnets systems to fasten or reversibly fasten two components together without requiring continuous transmission of power.

II. Example Electropermanent Magnets

As used herein, "soft" and "hard" are relative terms relating to the relative magnetic coercivity between two magnetic materials.

As used herein, an "OFF" (or unactivated) state means that the EPM has substantially no external magnetic field, such that it has no contextually significant or practical magnetic holding force on other materials for a given application. As used herein, an "ON" (or activated) state means that the EPM has a substantial external magnetic field, such that it has contextually significant or practical magnetic holding force on other materials for a given application.

Figure 1B:
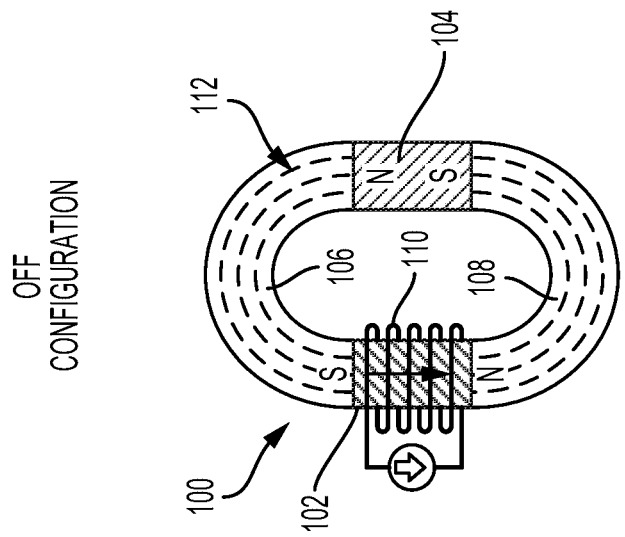
FIG. 1B illustrates the EPM of FIG. 1A in an "OFF" configuration, in accordance with an example implementation.
Figure 1A:
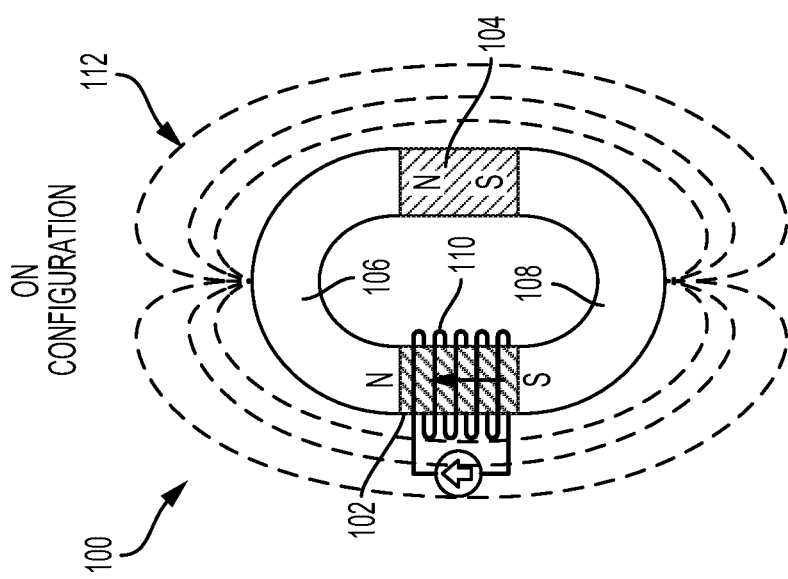
FIG. 1A illustrates an EPM in an "ON" configuration, in accordance with an example implementation.

FIG. 1A illustrates an EPM 100 in an "ON" configuration, and FIG. 1B illustrates the EPM 100 in an "OFF" configuration, in accordance with an example implementation. The EPM 100 includes two permanent magnets 102 and 104 connected by u-shaped elements 106 and 108. The elements 106 and 108 could be made, for example, of a high magnetic permeability material such as magnet steel iron alloy. As an example, the elements 106 and 108 could be made of Hiperco®, which includes an iron-cobalt-vanadium soft magnetic alloy that exhibits high magnetic saturation (24 kilogauss), high direct current maximum permeability, low direct current coercive force, and low alternating current core loss. Other materials may also be used.

The permanent magnet 102 is a low coercivity (soft) magnet. As an example, the permanent magnet 102 could be AlNiCo, an iron alloy with aluminum (Al), nickel (Ni) and cobalt (Co). The permanent magnet 104 is a high coercivity (hard) magnet. As an example, the permanent magnet 104 could be a N40 grade rare-earth magnet such as a neodymium magnet, also known as NdFeB, NIB or Neo magnet, which is a rare earth permanent magnet made from an alloy of neodymium, iron and boron. Both example materials, i.e., NdFeB and AlNiCo, may have the same remanence (around 1.3 Teslas) but AlNiCo has a lower intrinsic coercivity of 50 kiloamperes/meter (kA/m) while NdFeB has an intrinsic coercivity of 1120 kA/m. In the description provided herein AlNiCo and NdFeB are used as examples of materials for the permanent magnets 102 and 104; however, other materials could be used where one magnetic material has a lower coercivity than the other, preferably at a minimum intrinsic coercivity ratio of 10:1, though lower and higher ratios are contemplated.

A coil 110 is wound around the permanent magnet 102. The coil 110 is designed such that if an electric pulse of sufficient power and minimum duration (e.g., approximately 20V at 5A peak current for 100 µs for millimeter and centimeter scale AlNiCo/NIB EPMs) is provided through the coil 110 in one direction, the generated magnetic field will be higher than the intrinsic coercivity ($H_{ci}$) of the permanent magnet 102, and can thus change its magnetic state or magnetization. In this example, the permanent magnet 102 is shown as being magnetized in the direction of the field inside the coil 110. Applying an electric pulse in the opposite direction will cause magnetization of the permanent magnet 102 in the opposite direction.

As an example, if the permanent magnet 102 is magnetized such that the north pole (N) of both permanent magnets 102 and 104 are pointing in the same direction (e.g., up in FIG. 1A), the magnetic configuration of FIG. 1A is obtained. Particularly, the element 106 would have two magnetic norths at its ends and the element 108 would have two magnetic souths (S) at its ends. In this case, the element 106 may operate as a north pole of the EPM 100, and the element 108 may operate as a south pole of the EPM 100. Further, the element 106 may concentrate but not contain magnetic flux lines 112 and thus the magnetic flux will flow externally through the air (or other external medium) seeking the element 108 (magnetic south). In this configuration, the EPM 100 may be referred to as being in an "ON" state.

Applying an electric pulse through the coil 110 in the opposite direction magnetizes the permanent magnet 102 in the opposite direction. Thus, in this case, the element 106 would have a north pole (N) at one end and a south pole (S) at the other end, whereas the element 108 has opposite poles at its ends compared to the element 106 as illustrated in FIG. 1B. In this configuration, the magnetic flux lines 112 may be concentrated inside both elements 106 and 108 creating a closed circuit for the magnetic field because of the high permeability of the elements 106 and 108. However, no substantial external magnetic field is generated and the EPM 100 may be referred to as being in an "OFF" state. In this manner, using an electric pulse through the coil 110, the magnetic state of the EPM 100 can be switched between the "ON" and "OFF" states.

Although FIGS. 1A and 1B illustrate the coil 110 wound around the permanent magnet 102, but not the permanent magnet 104. In other example configurations, the coil 110 could be wound around both permanent magnets 102 and 104. As long as one of the magnets has lower intrinsic coercivity than the other, and the power and duration of the electric pulse is less than threshold required to change the magnetization state of the hard magnet, the magnetization direction of the magnet with lower coercivity would flip without changing the other magnet's direction of magnetization.

Figure 2:
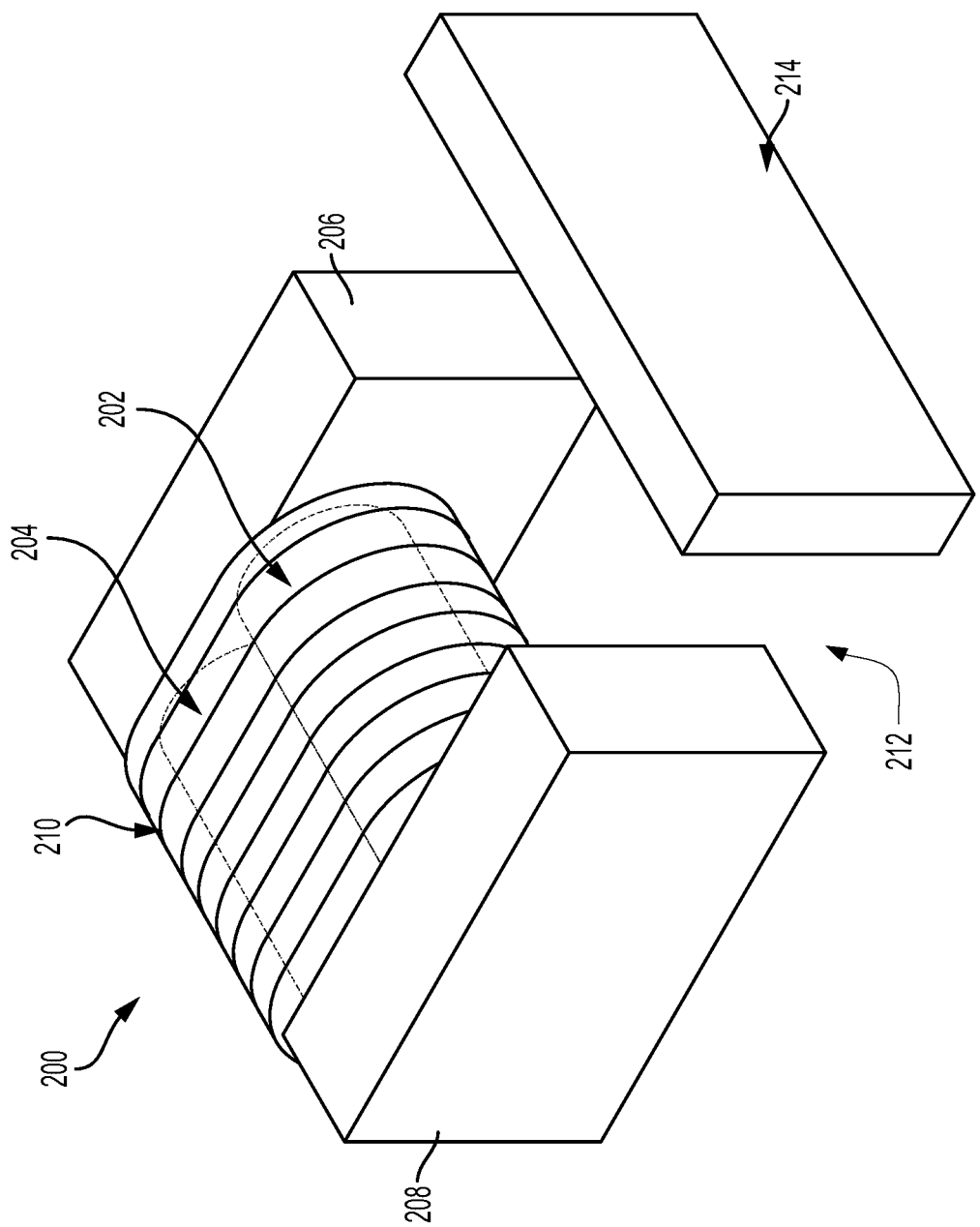
FIG. 2 illustrates an alternative configuration for an EPM, in accordance with an example implementation.

FIG. 2 illustrates an alternative configuration for an EPM 200, in accordance with an example implementation. As shown in FIG. 2, the EPM 200 includes a first permanent magnet 202 made of, for example, AlNiCO and a second permanent magnet 204 made of, for example, NdFeB. The permanent magnets 202 and 204 are disposed between keepers or elements 206 and 208 (made from magnet steel or Hiperco®, for example) configured to hold the permanent magnets 202 and 204 and concentrate magnetic flux lines. The permanent magnets 202 and 204 could be substantially parallel to each other. The magnets 202 and 204 may be affixed to the elements 206 and 208 by adhesive or other means.

A coil 210 may be wound around both permanent magnets 202 and 204. The coil 210 is designed such that if an electric pulse of sufficient power and duration is provided therethrough, the generated magnetic field will be higher than the intrinsic coercivity ($H_{ci}$) of the first permanent magnet 202, but not the second permanent magnet 204. Thus, magnetization of the first permanent magnet 202 may change (depending on pulse polarity), while magnetization of the second permanent magnet 204 remains unchanged.

When the EPM 200 is in the "ON" state with both permanent magnets 202 and 204 magnetized in the same direction, the generated external magnetic field traverses a gap 212 and interacts with a target object 214. Particularly, if the target object 214 is made of a ferromagnetic material (e.g., magnet steel), then the generated external magnetic field may cause the target object 214 to be attracted to the EPM 200 and specifically to the elements 206 and 208. In some examples, the target object 214 could include a permanent magnet or another EPM.

Figure 3:
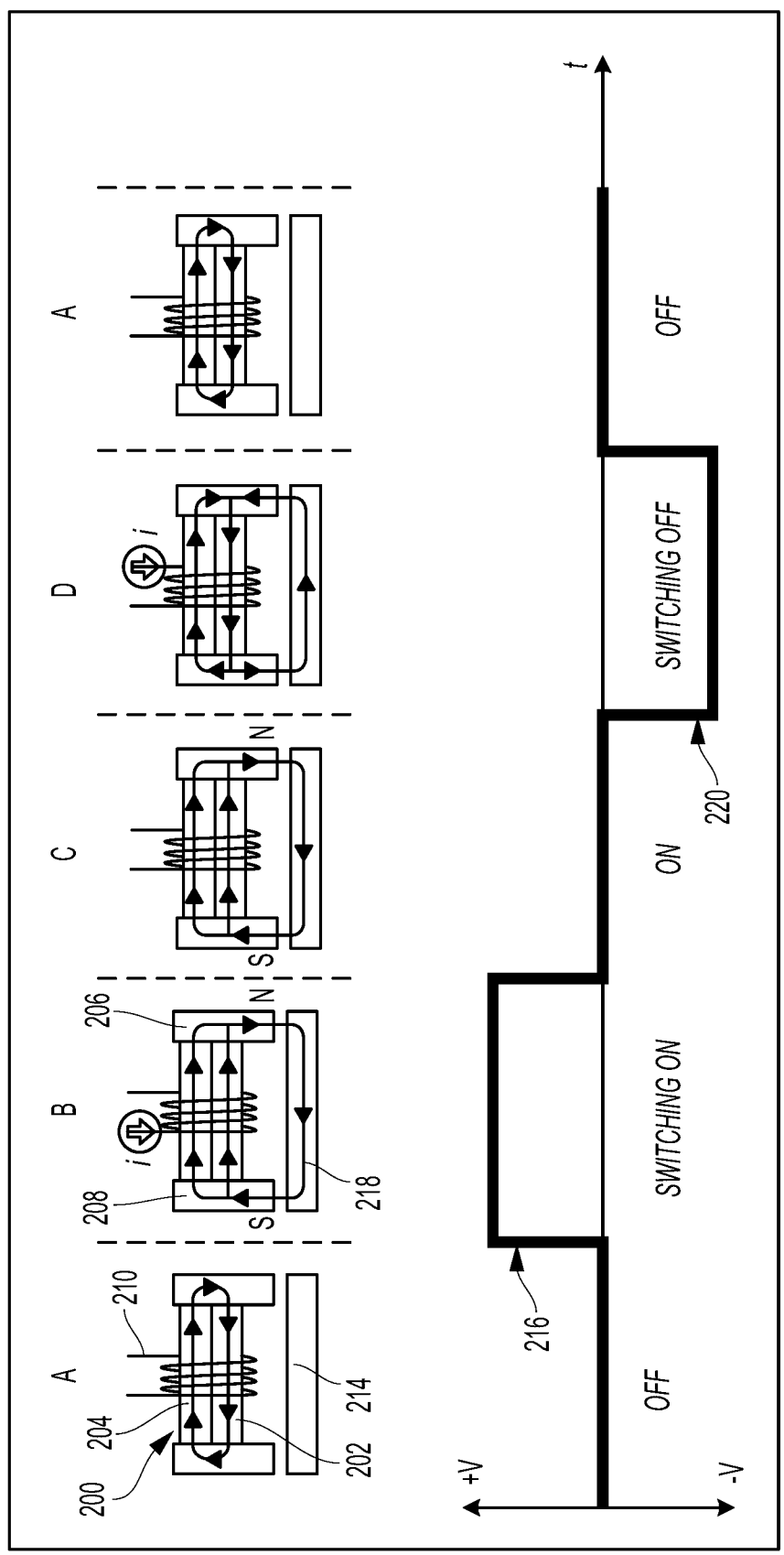
FIG. 3 illustrates operation of the EPM shown in FIG. 2, in accordance with an example implementation.

FIG. 3 illustrates operation of the EPM 200 in conjunction with the target object 214, in accordance with an example implementation. FIG. 3 illustrates the EPM 200 in four states: A, B, C, and D. State A illustrates the EPM 200 in the "OFF" state, state B illustrates switching on the EPM 200, state C illustrates the EPM 200 in the "ON" state, and state D illustrates switching off the EPM 200.

In the "OFF" state shown in state A, the two permanent magnets 202 and 204 are oppositely polarized, and thus the resulting magnetic flux circulates inside the EPM 200, and no magnetic force (i.e., no substantial or practical magnetic force) acts on the target object 214. When a positive electric pulse 216 is provided through the coil 210 as shown in state B, a magnetic flux is imposed through the first permanent magnet 202 thus magnetizing it rightward such that both permanent magnets 202 and 204 are polarized in the same direction. As a result, the magnetic field of the first permanent magnet 202 reinforces the magnetic field of the second permanent magnet 204 and an external magnetic field represented by flux line 218 is generated. The element 206 operates as a north pole (N) and the element 208 operates as a south pole (S). The external magnetic field traverses the gap 212 and attracts the target object 214 toward the EPM 200.

The EPM 200 remains in the "ON" state even when the electric pulse 216 ends as shown in state C. Therefore, the EPM 200 is distinguished from electromagnets in that the EPM 200 may remain in the "ON" state without a continuous current through the coil 210. Thus the EPM 200 may operate with a reduced power consumption compared to electromagnets over arbitrarily long time periods.

When a negative electric pulse 220 is provided through the coil 210 as shown in state D, a magnetic field is imposed through the first permanent magnet 202 thus magnetizing it leftward such that the two permanent magnets 202 and 204 are oppositely polarized. The external magnetic field represented by the flux line 218 in state B then decays and substantially disappears, and no magnetic force acts on the target object 214. Thereafter, the EPM 200 reverts back to the "OFF" state illustrated in state A.

III. Example Wireless Power EPM and Wand

A wireless power transfer system may be used to provide the electrical pulse required to change the magnetization state of an EPM. Disclosed herein are examples of such systems.

Figure 4:
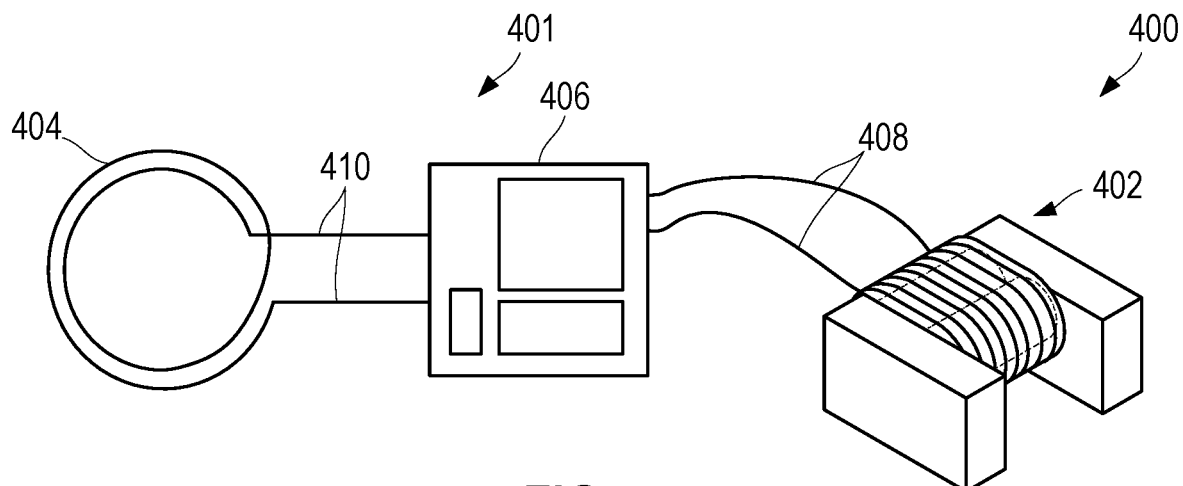
FIG. 4 illustrates a wireless power EPM, in accordance with an example implementation.

FIG. 4 illustrates an example embodiment of an EPM 402 electrically coupled to a wireless power receiver system 401. An induction coil 404 may be connected via leads 410 to a circuit 406, which may in turn be connected via leads 408 to an EPM 402. The wireless power receiver system 401 may receive energy from a wireless power transmitter (e.g., wireless power transmitter 501 in FIGS. 5A and 5B) via the induction coil 404 and convert the received energy to a unidirectional current (e.g., direct current "DC," rectified alternating current, rectified "AC," constant polarity, etc.) via the circuit 406. The induction coil 404 may have a number of turns and be sized appropriately to receive and supply sufficient power to flip the magnetic state of the EPM 402. The circuit 406 may include a rectifier to convert the alternating current ("AC") from the induction coil 404 to unidirectional current. The circuit 406 may include a voltage controller and/or one or more transistors to maintain a specific, maximum limited, and/or minimum limited voltage to the EPM 402. The circuit 406 may include one or more capacitors to, for example, store and provide sufficient peak current flow to the EPM 402 as the current demand of increases. The circuit 406 may include one or more timers to delay the start of unidirectional current flow to the EPM 402 until sufficient power has been stored in the wireless power receiver 401 and/or to stop unidirectional current flow after a pulse of sufficient power and duration to switch the state of the EPM 402. The circuit 406 may include a circuit configured to conditionally change the polarity of the unidirectional current flow. For example, the circuit 406 may reverse the unidirectional current each time it is energized and supplies power to the EPM 402, thereby switching the state of the EPM each time the circuit 406 is activated.

Figure 5A:
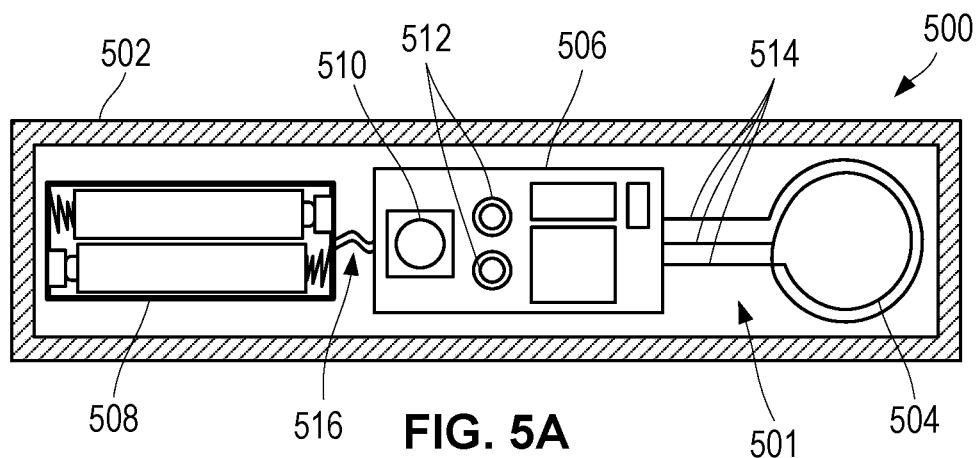
FIG. 5A illustrates a top cutaway view of an EPM wand, in accordance with an example implementation.
Figure 5B:
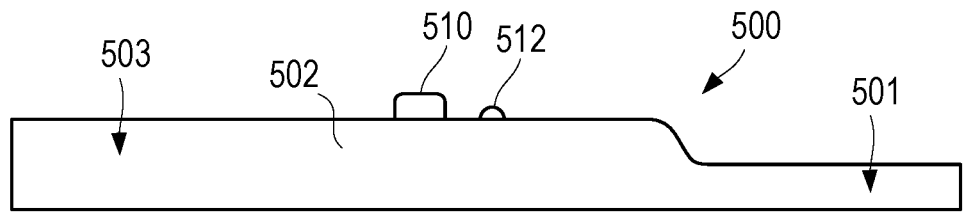
FIG. 5B illustrates a side view of the EPM wand of FIG. 5B, in accordance with an example implementation.

A handheld EPM wand described herein may be used to activate or deactivate an EPM connected to a wireless power receiver (e.g., wireless power receiver system 401). FIGS. 5A and 5B illustrate a top cutaway and side view respectively of a handheld EPM wand 500. A case 502 with a human-holdable handle 503 may contain a wireless power transmitter 501 which may be connected to a power source 508 via leads 516. The power source 508 may be a battery or a plugin power source configured to receive power from electrical mains. The wireless power transmitter 501 may include a circuit 506 connected to an induction coil 504 via leads 514. The induction coil 504 may have a number of turns and be sized appropriately to supply sufficient power to flip the magnetic state of an EPM, such as EPM 402. The circuit 506 may include an oscillator to supply AC to the induction coil 504. The circuit 406 may include a voltage controller and/or one or more transistors to maintain a specific, maximum limited, and/or minimum limited voltage to the induction coil 504. The circuit 506 may include one or more capacitors to store and provide sufficient energy to the induction coil 504. The circuit 506 may include a user-operable switch 510 (e.g., a button or toggle switch) operable by a human hand to switchably supply power to the induction coil 504. Pressing the switch 510 may activate the wireless power transmitter 501 and allow power to be wirelessly transmitted to a wireless power receiver (e.g., wireless power receiver system 401) that is in proximity to the handheld EPM wand 500. The EPM wand 500 may include one or more indicator lights 512 (e.g., LEDs) that indicate when the wireless power transmitter 501 is activated.

IV. Example Wireless Power EPM Coupling Mechanisms

Figure 6:
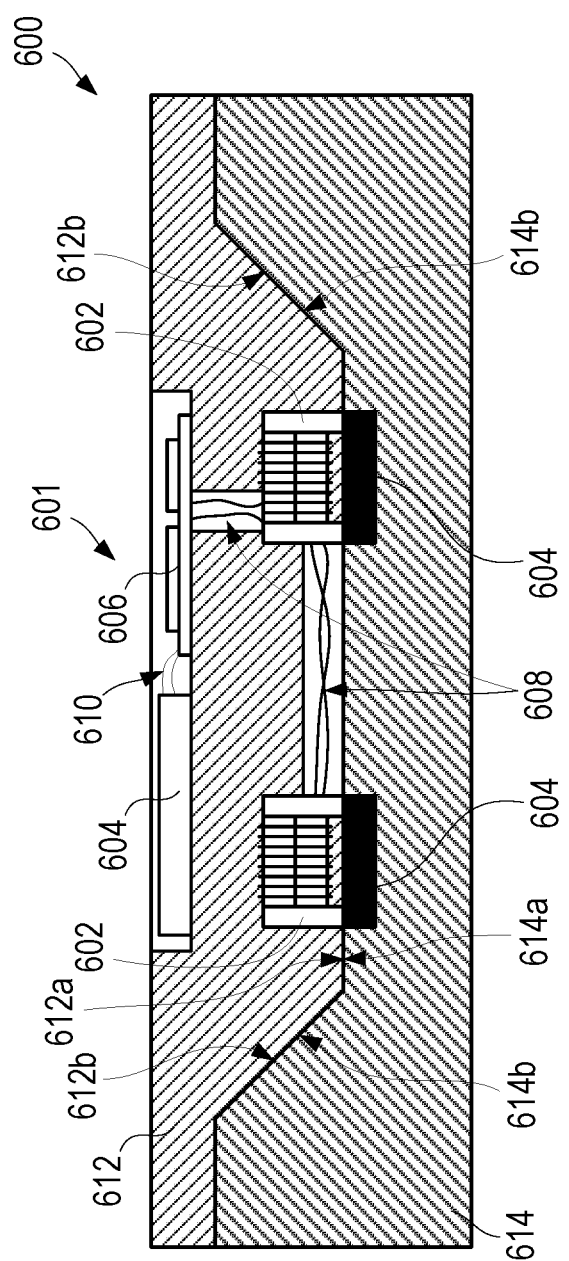
FIG. 6 illustrates a wireless power EPM coupling mechanism, in accordance with an example implementation.

FIG. 6 illustrates a side cutaway view of a wireless power EPM coupling mechanism 600 that may be implemented with a wireless power EPM system, such as system 400 and in conjunction with a portable wireless EPM activation device, such as EPM wand 500 described herein.

Coupling mechanism 600 may include a locking block 612 and a receiver block 614 configured to reversibly and fixedly couple to each other. The receiver block 614 may include a recessed cavity which may be defined by a bottom surface 614*a* and side surfaces 614*b*. Preferably the recessed cavity is configured to receive a protrusion of the locking block 612, where the protrusion may be defined by a bottom surface 612*a* and and side surfaces 612*b*. The side surfaces 612*b* and 614*b* may be inclined (as shown), perpendicular, or some other orientation to the bottom surfaces 612*a* and 614*a*, such that the respective surfaces may mate with each other, allowing the protrusion to fit within the recessed cavity and restricting movement of the locking block 612 with respect to the receiving block 614 in one or more axes, while still allowing the locking block 612 to be placed in, and removed from, the receiver block 614.

The receiving block 614 may include one or more magnetic targets 604. The magnetic targets 604 may be formed from a high magnetic permeability material, such as iron, or a magnetic material, such that an EPM may exert an attractive force on the magnetic target 604 when the EPM is in an "ON" state. Each magnetic target 604 may be located at a surface of the recessed cavity, such as the bottom surface 614*a* (as shown) or at an inclined surface 614*b*, or at another location within the receiving block 614 such that an EPM within the locking block 612 may magnetically couple with the magnetic target 604.

The locking block 612 may include a wireless power EPM system. Locking block 612 illustrates an example embodiment of two EPMs 602 electrically coupled to a wireless power receiver system 601 via leads 608. The wireless power receiver system 601 and components therein may be the same or similar to the wireless power receiver system 401 and components therein, including an induction coil 604 connected to a circuit 606 via leads 610, where the circuit 606 may include components described with respect to circuit 406 and/or additional components. Preferably the induction coil 604 may be located near a user-accessible surface of the locking block 612 such that a wireless power transmitter system, such as EPM wand 500, may be placed in proximity to the induction coil 604 for wireless power transfer. EPMs 602 may be located within the locking block 612 protrusion with the EPMs' respective flux concentrating elements (e.g., elements 206 and 208 of EPM 200) aligned with the magnetic target. As illustrated in FIG. 6, the EPMs 602 are located at the bottom surface 612*a* of the protrusion and are positioned such that they are aligned opposite the respective magnetic targets 604.

In operation, the locking block 612 may be placed against the receiving block 614 such that the protrusion fits in the recessed cavity and protrusion defining surfaces 612*a* and 612*b* mate with corresponding recessed cavity defining surfaces 614*a* and 614*b*. A wireless power transmitter, such as EPM wand 500, may be placed in proximity to locking block 612 and activated such that the wireless power receiver 601 supplies an electrical pulse to the EPMs 602 of sufficient power and duration to switch the magnetic state of the EPMs 602 to an ON state. In the ON state, the EPMs 602 will fixedly couple the protrusion within the recessed cavity thereby securing the locking block 612 to the receiving block 614. The wireless power transmitter, such as EPM wand 500, may later again be placed in proximity to locking block 612 and activated such that the wireless power receiver 601 supplies an electrical pulse to the EPMs 602 of sufficient power and duration to switch the magnetic state of the EPMs 602 to an OFF state. As previously described with respect to circuit 406, the circuit 606 may contain circuitry capable of switching the polarity of the electrical pulse such that the wireless power transmitter may be used to both activate and deactivate the EPMs 602. In the OFF state, the EPMs 602 will no longer fixedly couple the protrusion within the recessed cavity, thereby allowing the locking block 612 to be removed from the receiving block 614.

FIGS. 7A and 7B illustrate a cutaway side view of an alternative configuration for a wireless power EPM coupling mechanism in an uncoupled state and a coupled state, respectively, in accordance with an example implementation. The coupling mechanism 700 may be implemented with a wireless power EPM system, such as system 400 and in conjunction with a portable wireless EPM activation device, such as EPM wand 500 described herein.

Coupling mechanism 700 may include a locking block 712 and a receiver block 714 configured to reversibly and fixedly couple to each other. The receiver block 714 may include a top mating surface 724 and a recessed cavity 718. The side surfaces 720 (or portions thereof) of the recessed cavity 718 may be undercut beneath the top mating surface 724 to provide an engagement surface for rotatable latches 716 mounted in the locking block 712. As illustrated, the side surfaces 720 are undercut linear inclined surfaces, but they may take other forms as well. For example, the side surfaces may include non-linear undercut geometry such as dimples, grooves, or notches that are configured to mate with matching rotatable latches shapes.

The rotatable latches 716 may be formed as, or include, one or more magnetic targets 715. The magnetic targets 715 may be formed from a high magnetic permeability material, such as iron, or a magnetic material, such that an EPM may exert an attractive force on, and may couple with, the magnetic target 715 and the rotatable latch 716 when the EPM is in an "ON" state. The rotatable latches 716 may rotate about respective pins 716*a* or another via another style of rotating joint.

The locking block 712 may include a wireless power EPM system. Locking block 712 illustrates an example embodiment of two EPMs 702 electrically coupled to a wireless power receiver system 701 via leads 708. The wireless power receiver system 701 and components therein may be the same or similar to the wireless power receiver system 401 and components therein, including an induction coil 704 connected to a circuit 706 via leads 710, where the circuit 706 may include components described with respect to circuit 406 and/or additional components. Preferably the induction coil 704 may be located near a user-accessible surface of the locking block 712 such that a wireless power transmitter system, such as EPM wand 500, may be placed in proximity to the induction coil 704 for wireless power transfer. EPMs 702 may be located within the locking block 712 such that the EPMs' 702 respective flux concentrating elements (e.g., elements 206 and 208 of EPM 200) are aligned with the magnetic targets 715 and, when in in an ON state, can cause rotatable latches 716 to rotate towards the EPMs 702 and engage with the the side surfaces 720 of the receiver block 714, reversibly coupling the locking block 712 to the receiver block 714.

In operation, the locking block 712 may be placed against the receiving block 714 with the EPMs 702 in an OFF state so that the rotatable latches 716 are not attracted to and are uncoupled from the EPMs and therefore in a first position allowing the rotatable latches 716 to enter recessed cavity 718. A wireless power transmitter, such as EPM wand 500, may be placed in proximity to locking block 712 and activated so that the wireless power receiver 701 supplies an electrical pulse to the EPMs 702 of sufficient power and duration to switch the magnetic state of the EPMs 702 to an ON state. In the ON state, the EPMs 702 will attract and may fixedly couple to the magnetic targets 715, orienting the rotatable latches 716 to a second position. In the second position, the rotatable latches 716 secure the locking block 712 to the receiver block 714. The wireless power transmitter, such as EPM wand 500, may later again be placed in proximity to locking block 712 and activated so that the wireless power receiver 701 supplies an electrical pulse to the EPMs 702 of sufficient power and duration to switch the magnetic state of the EPMs 702 to an OFF state. As previously described with respect to circuit 406, the circuit 706 may contain circuitry capable of switching the polarity of the electrical pulse such that the wireless power transmitter may be used to both activate and deactivate the EPMs 702. In the OFF state, the EPMs 702 may decouple from the magnetic targets 715 allowing the rotatable latches 716 to orient in the first position and the locking block 712 to be removed from the receiving block 714.

V. Additional Example EPMs and Wireless Power EPMs

Figure 8B:
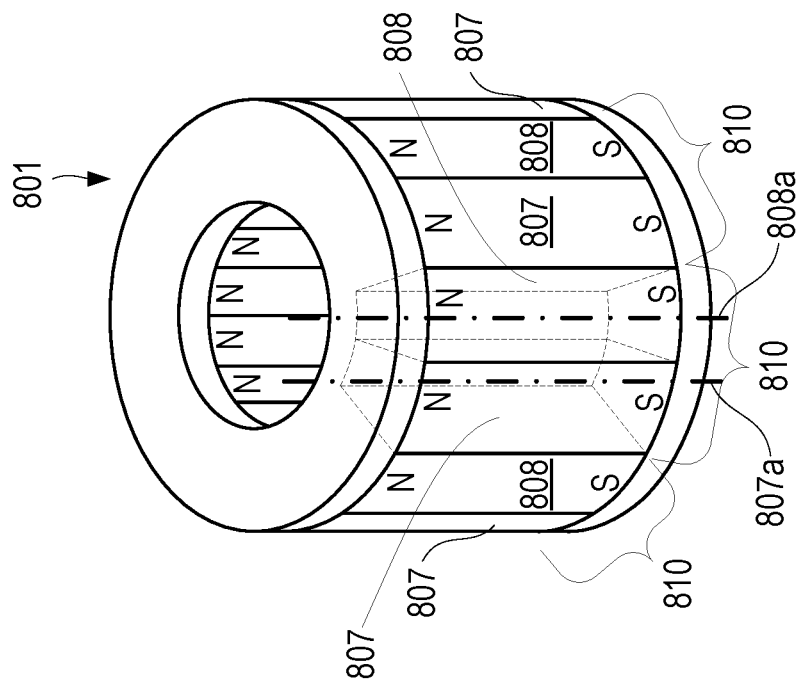
FIG. 8B illustrates the tubular EPM of FIG. 8A with portions removed for clarity.
Figure 8A:
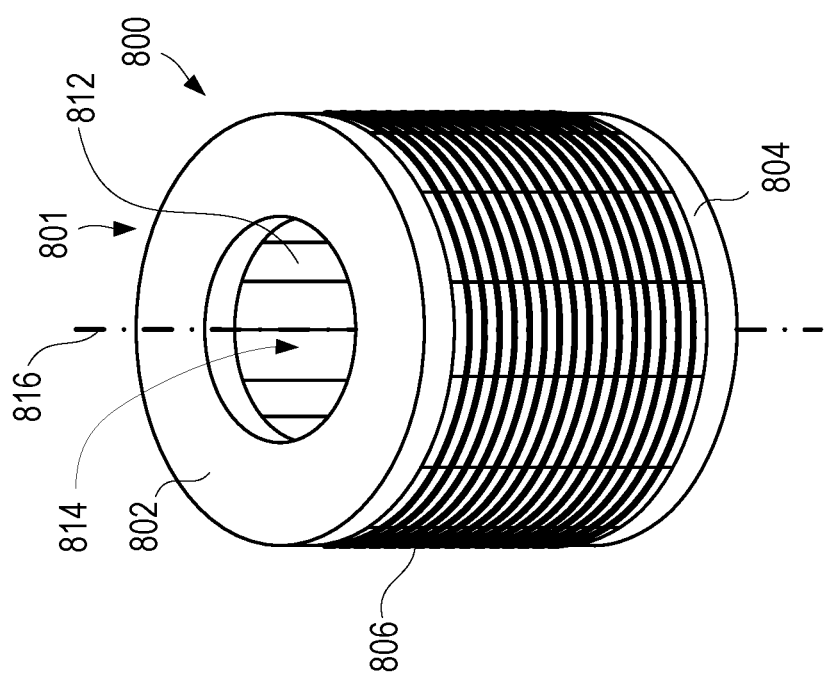
FIG. 8A illustrates a tubular EPM, in accordance with an example implementation.
Figure 11:
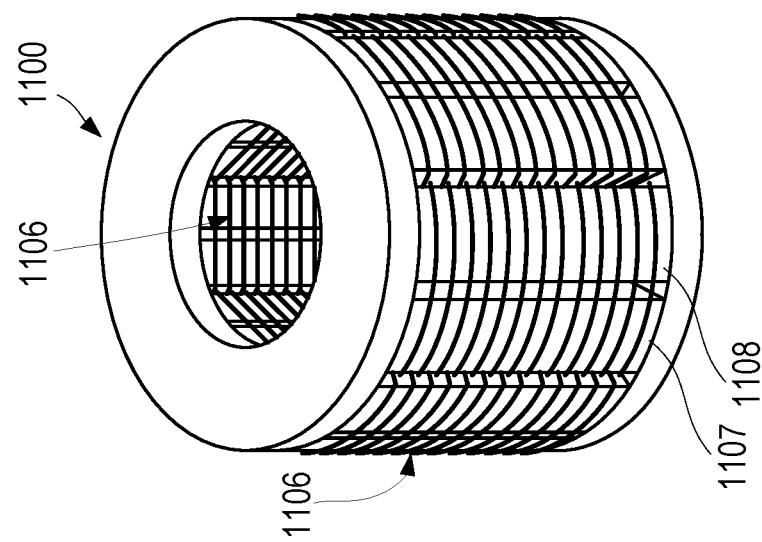
FIG. 11 illustrates an alternative configuration for a tubular EPM, in accordance with an example implementation.
Figure 10:
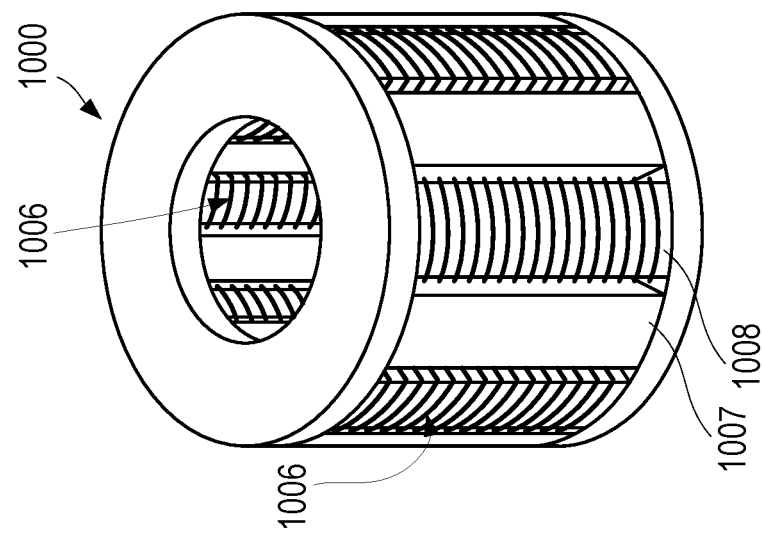
FIG. 10 illustrates an alternative configuration for a tubular EPM, in accordance with an example implementation.
Figure 9:
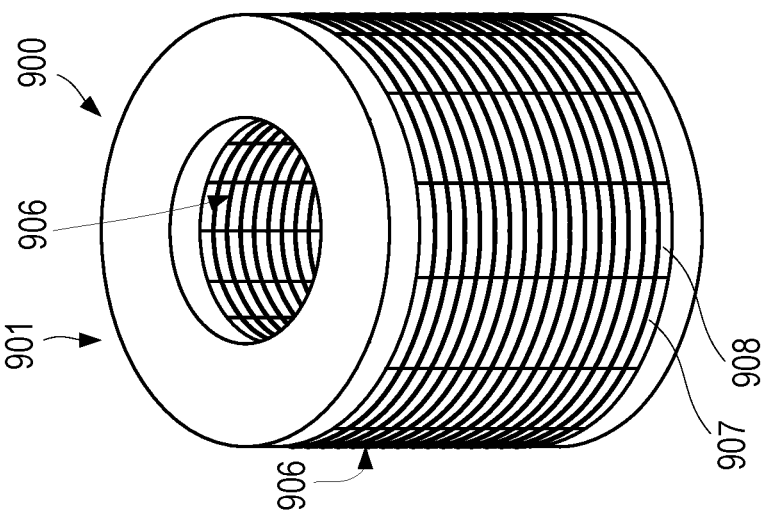
FIG. 9 illustrates an alternative configuration for a tubular EPM, in accordance with an example implementation.

FIG. 8A illustrates a tubular EPM, in accordance with an example implementation. FIG. 8B illustrates the tubular EPM of FIG. 8A with the electrical coil removed for clarity. FIG. 9 through FIG. 11 illustrate alternative configuration for a tubular EPM, in accordance with example implementations.

FIG. 8A illustrates a tubular EPM 810 with a core 801 at least partially surrounded about its outer circumference with an electrical coil 806. As shown in FIGS. 8A and 8B, the EPM 800 may include one or more pairs 810 of a first permanent soft magnet 808 made of, for example, AlNiCO and a permanent hard magnet 807 made of, for example, NdFeB. In the illustration shown, a large plurality of magnet pairs create the tubular shape; however, a fewer or greater quantity of magnet pairs is contemplated, including one magnet pair where the magnets may be alternatively shaped to form the tubular structure. The permanent magnets 807 and 808 may be arranged substantially adjacent and parallel to each other around a closed curvilinear space 812 defining a bore 814 and central longitudinal axis 816. Each magnet 807 and 808 may have a magnetic axis (e.g., axes 807a and 808a) through the respective magnet's poles and each magnetic axis may be substantially parallel to the central longitudinal axis 816.

The permanent magnets 807 and 808 may be disposed between magnetically permeable keepers or elements 802 and 804 (made from magnet steel or Hiperco®, for example) configured to hold the permanent magnets 807 and 808 and concentrate magnetic flux lines. As illustrated, the flux concentrating elements 802 and 804 may be annular rings at each longitudinal end of the magnets. The magnets 807 and 808 may be affixed to the elements 802 and 804 and/or each other by adhesive or other means.

An electrical coil 806 may be wound around the outer circumferential surface of the magnet pairs 810 that form the core 801. The coil 806 is designed such that if an electric pulse of sufficient power and duration is provided therethrough, the generated magnetic field will be higher than the intrinsic coercivity ($H_{ci}$) of the soft permanent magnet 808, but not the hard permanent magnet 807. Thus, magnetization of the soft permanent magnet 808 may change, while magnetization of the hard permanent magnet 807 remains unchanged.

When the tubular EPM 800 is in the "ON" state with both permanent magnets 807 and 808 magnetized in the same direction (as illustrated in FIG. 8B with poles "N" and "S"), an external magnetic field may be capable of interacting with a magnetic target. Particularly, if the magnetic target is made of a ferromagnetic material (e.g., magnet steel), then the external magnetic field may cause the magnetic target to be attracted to the EPM 800 and specifically to the element 802 and/or 804. In some examples, the magnetic target could include a permanent magnet or another EPM. When the tubular EPM 800 is in the "OFF" state with the permanent magnets 807 and 808 magnetized in opposing directions, the magnetic field will be internalized and will not substantially interact with, or attract, the magnetic target.

FIGS. 9 through 11 illustrate alternative embodiments of tubular EPMs with a core similar to or substantially the same as core 801. FIG. 9 illustrates a tubular EPM with a core 901 of alternating hard and soft permanent magnets 907 and 908. An electrical coil 906 may be wound around both the outer circumferential surface and the inner circumferential surface of the core 901. FIG. 10 illustrates a tubular EPM where the alternating hard and soft permanent magnets 1007 and 1008 may have a gap between the magnets to allow an electrical coil 1006 to be wound around each soft magnet 1008. FIG. 11 illustrates a tubular EPM where the alternating hard and soft permanent magnets 1107 and 1108 may have a gap between the magnets to allow an electrical coil 1106 to be wound around each pair of hard and soft magnets 1007 and 1008.

As shown for example in FIGS. 16 and 17, tubular EPMs, such as EPMs 800, 900, 1000, and 1100 may be electrically coupled to a wireless power receiver, such as wireless power receiver 401, in a similar manner or the same manner as EPM 402 may be connected to wireless power receiver 401.

VI. Example Wireless Power EPM Locking Pins

FIGS. 12A through 23 illustrate examples of locking pins that may be implemented with a wireless power EPM system, such as system 400 and in conjunction with a portable wireless EPM activation device, such as EPM wand 500. The embodiments in FIGS. 12A through 23 are illustrative only and not intended to be limiting. For example, the spring force, spring arrangement, and/or EPM and target arrangements, may be as shown or one or more may be reversed and/or rearranged and/or used in various combinations so that, for example, (i) activating an EPM may extend an engagement pin, (ii) activating an EPM may retract an engagement pin and/or hold an engagement pin retracted, (iii) deactivating an EPM may allow spring force to extend an engagement pin, and/or (iv) deactivating an EPM may allow spring force to retract an engagement pin. Accordingly, for example, in one locking pin embodiment, changing the state of one or more EPMs from OFF to ON may cause the engagement pins to be extended from a retracted position. In another locking pin embodiment, changing the state of one or more EPMs from ON to OFF may cause the engagement pins to be extended from a retracted position.

FIGS. 12A through 20 illustrate an example locking pin 1200. FIGS. 12A and 13A illustrate a side view of a wireless power EPM locking pin 1200 in a retracted state and extended state, respectively, in accordance with an example implementation. FIGS. 12B and 13B illustrate a top view of the wireless power EPM locking pin 1200, in accordance with an example implementation. Locking pin 1200 may have a case 1201 within which engagement pins 1203 may be located and through which the engagement pins 1203 may be extended beyond the outer dimensions of the case 1201. The engagement pins 1203 may also be retracted back within the case 1201. The locking pin 1200 is illustrated with four engagement pins 1203, but may have more or fewer engagement pins 1203, and the engagements pins 1203 may not all be identical or symmetrically arranged as illustrated in FIGS. 12A through 13B.

Figure 15:
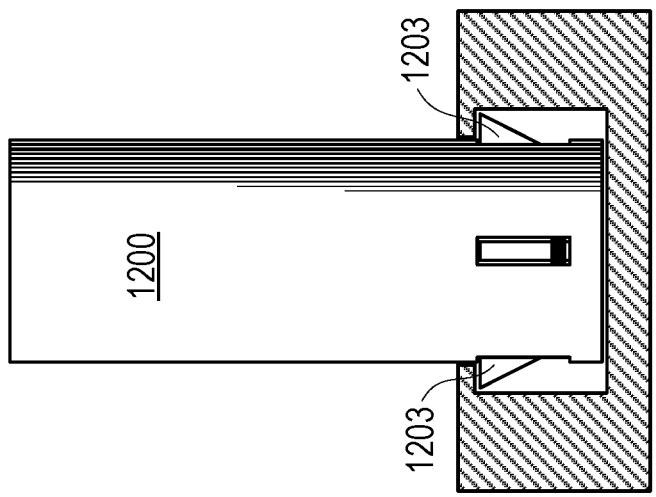
FIG. 15 illustrates a side view of a wireless power EPM locking pin inserted into a receiver block shown in cutaway view and with the locking pin in an extended state, in accordance with an example implementation.
Figure 14:
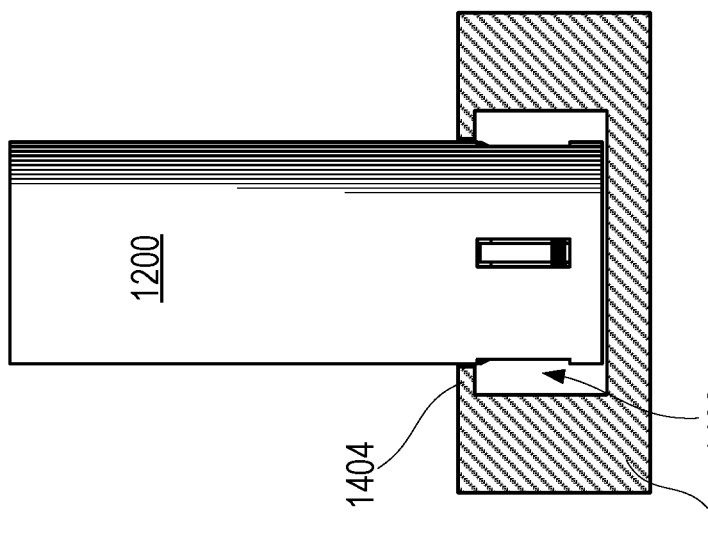
FIG. 14 illustrates a side view of a wireless power EPM locking pin inserted into a receiver block shown in cutaway view and with the locking pin in a retracted state, in accordance with an example implementation.

As illustrated in FIGS. 14 and 15, the locking pin 1200 may be inserted into an undercut blind hole or channel while the engagement pins 1203 are retracted. Then the engagement pins 1203 may be extended, securing the locking pin 1200 into the blind hole or channel. In the secured configuration, the locking pin 1200 may be used as a locating pin or a fixturing pin for locating or attaching other objects to the material that has the blind hole or channel. The locking pin 1200 may include exterior or interior threads or other features to aid the attachment of other objects to the locking pin once it is secured.

FIGS. 16 and 17 illustrate a side cutaway view of wireless power EPM locking pin 1200 in a retracted state and an extended state, respectively, in accordance with an example implementation. In this example implementation, the locking pin 1200 may drive a plunger 1212 with a wireless EPM 1202 in order to extend or retract engagement pins 1203.

The locking pin 1200 may include a wireless power EPM system. An EPM 1202 may be electrically coupled to a wireless power receiver system 1213 via leads 1208. The wireless power receiver system 1213 and components therein may be the same or similar to the wireless power receiver system 401 and components therein, including an induction coil 1204 connected to a circuit 1206 via leads 1210, where the circuit 1206 may include components described with respect to circuit 406 and/or additional components. Preferably the induction coil 1204 may be located near a user-accessible surface of the locking pin 1200 such that a wireless power transmitter system, such as EPM wand 500, may be placed in proximity to the induction coil 1204 for wireless power transfer.

In FIGS. 16 and 17, EPM 1202 is illustrated as a tubular EPM, such as EPM 800. Preferably EPM 1202 is fixedly coupled within case 1201 to prevent movement of the EPM 1202. For example, EPM 1202 may be secured to an internal structure 1211 (e.g., a tab) of case 1201 via adhesive or mechanical means. In FIG. 16, EPM 1202 is shown in an OFF (or unactivated) state and in FIG. 17, EPM 1202 is shown in ON state where it has attracted and coupled to the magnetic target 1214. Magnetic target 1214 may be coupled to or part of plunger 1212. In locking pin embodiments where the EPM 1202 is a tubular EPM, the plunger shaft 1216 may traverse through a bore of the tubular EPM. In other embodiments, EPM 1202 may take other forms, including but not limited to one or multiple EPMs 202 which may be arranged about the plunger shaft 1214.

Plunger shaft 1216 may couple the magnetic target 1214 to an actuator head 1218 that may include an inclined surface 1220 for engaging with, and extending, the engagement pins 1203. Internal structure 1211 and/or internal structure 1209 (e.g., a tab) may together or separately locate the plunger 1212 in either or both a radial location and/or a longitudinal location. For example, the internal structures 1209 and 1211 may prevent the plunger from moving radially within the the case 1201 and/or may prevent the actuator head 1218 from moving away from engagement with the engagement pins 1203. The engagement pins 1203 may include a mating inclined surface 1203a such that when the actuator head 1218 moves toward the engagement pins 1203, the inclined surface 1220 may interact with the inclined surface 1203a to move the engagement pins 1203 from a retracted position as shown in FIG. 16 to an extended position as shown in FIG. 17. The case 1201 may includes a series of apertures 1205 through which engagement pins 1203 may extend and/or retract.

Locking pin 1200 may further include a retention ring 1207 which may apply a retention force sufficient to retain the engagement pins 1203 in the retracted position when the EPM 1202 is in the OFF state and to allow the engagement pins 1203 to move from the retracted position in FIG. 16 to the extended position in FIG. 17 when the EPM 1202 is in the ON state. The retention force of retention ring 1207 may also be sufficient to return the engagement pins 1203 from the extended position to the retracted position when the EPM 1202 is switched from the ON state to the OFF state. The retention ring 1207 may take various forms including, but not limited to an elastic band, such as an O-ring or rubber band, or a plastic or metal spring or clip.

Figure 18:
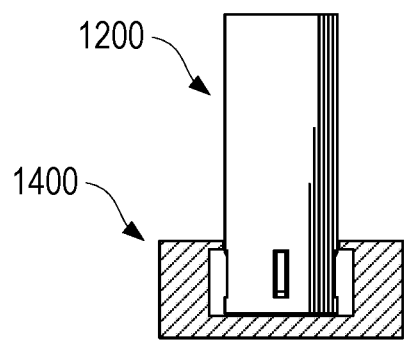
FIG. 18 illustrates a side view of an unactivated wireless power EPM locking pin inserted into a receiver block shown in cutaway view, in accordance with an example implementation.
Figure 19:
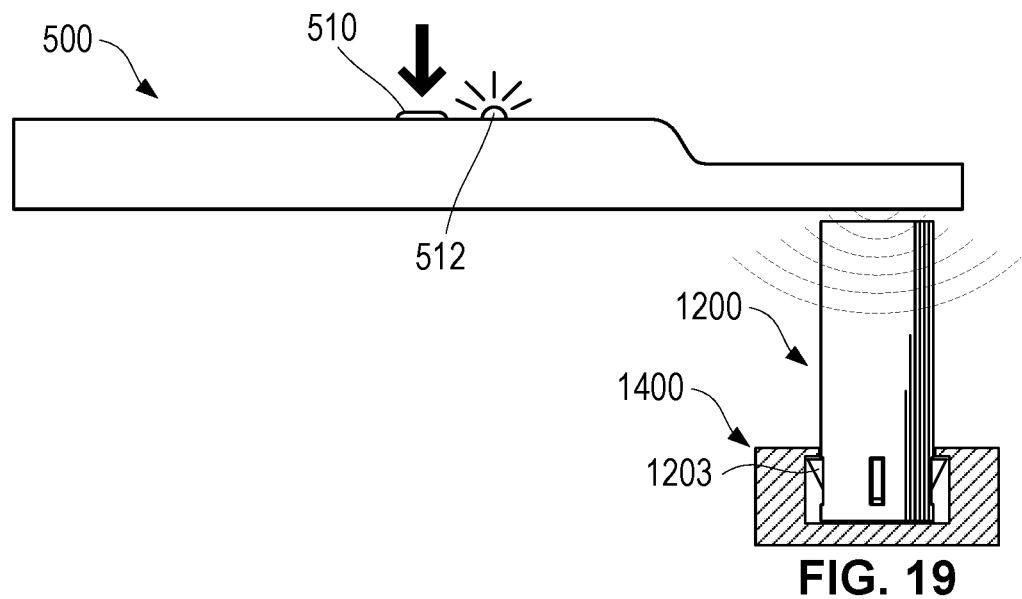
FIG. 19 illustrates an EPM wand activating a wireless power EPM locking pin, in accordance with an example implementation.
Figure 20:
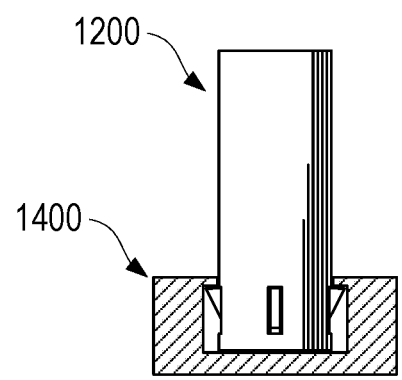
FIG. 20 illustrates a side view of an activated wireless power EPM locking pin inserted into a receiver block shown in cutaway view, in accordance with an example implementation.

In operation, the locking pin 1200 may be inserted into an undercut blind hole or channel in a receiving block 1400 while the engagement pins 1203 are retracted, as shown in FIG. 18. A wireless power transmitter, such as EPM wand 500, may be placed in proximity to locking pin 1200 and activated by pressing button 510, as shown in FIG. 19. Energy may then be wirelessly transmitted from the EPM wand 500 to the wireless power receiver 1213, which may then supply an electrical pulse to the EPM 1202 of sufficient power and duration to switch the magnetic state of the EPM 1202 from an OFF state to an ON state. In the ON state, the EPM 1202 may attract the magnetic target 1214, causing the conical actuator 1218 to slide along the inclined surface 1203a of the engagement pins 1203 and move the engagement pins 1203 from the retracted position to the extended position. As a result, the locking pin 1200 may be secured within the receiving block 1400 and the EPM wand 500 may be removed from proximity to the locking pin 1200, as reflected in FIG. 20.

To remove the locking pin 1200, the EPM wand 500 may again be placed in proximity to locking pin 1200 and activated so that the wireless power receiver 1213 supplies an electrical pulse to the EPM 1202 of sufficient power and duration to switch the magnetic state of the EPM 1202 to an OFF state. In the OFF state, the EPM 1202 may no longer attract the magnetic target 1214, thereby allowing engagement pins 1203 to retract and the locking pin 1200 to be removed from the hole or channel. As previously described with respect to circuit 406, the circuit 1206 may contain circuitry capable of switching the polarity of the electrical pulse such that the wireless power transmitter may be used to both activate and deactivate the EPM 1202. The circuit 1206 may reverse the polarity of the electrical pulse each time the circuit 1206 is energized.

Figure 21:
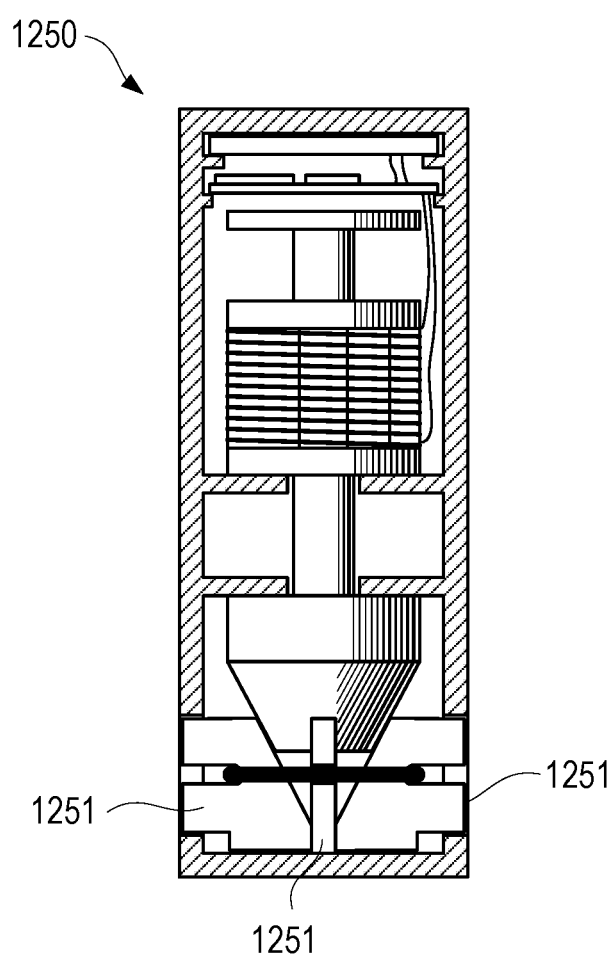
FIG. 21 illustrates a side cutaway view of an alternative configuration wireless power EPM locking pin in a retracted state, in accordance with an example implementation.

FIG. 21 illustrates an alternative embodiment of a locking pin 1200, shown as locking pin 1250, which includes differently configured engagement pins 1251 that may have multiple surfaces for sliding along apertures through the locking pin case.

Figure 22A:
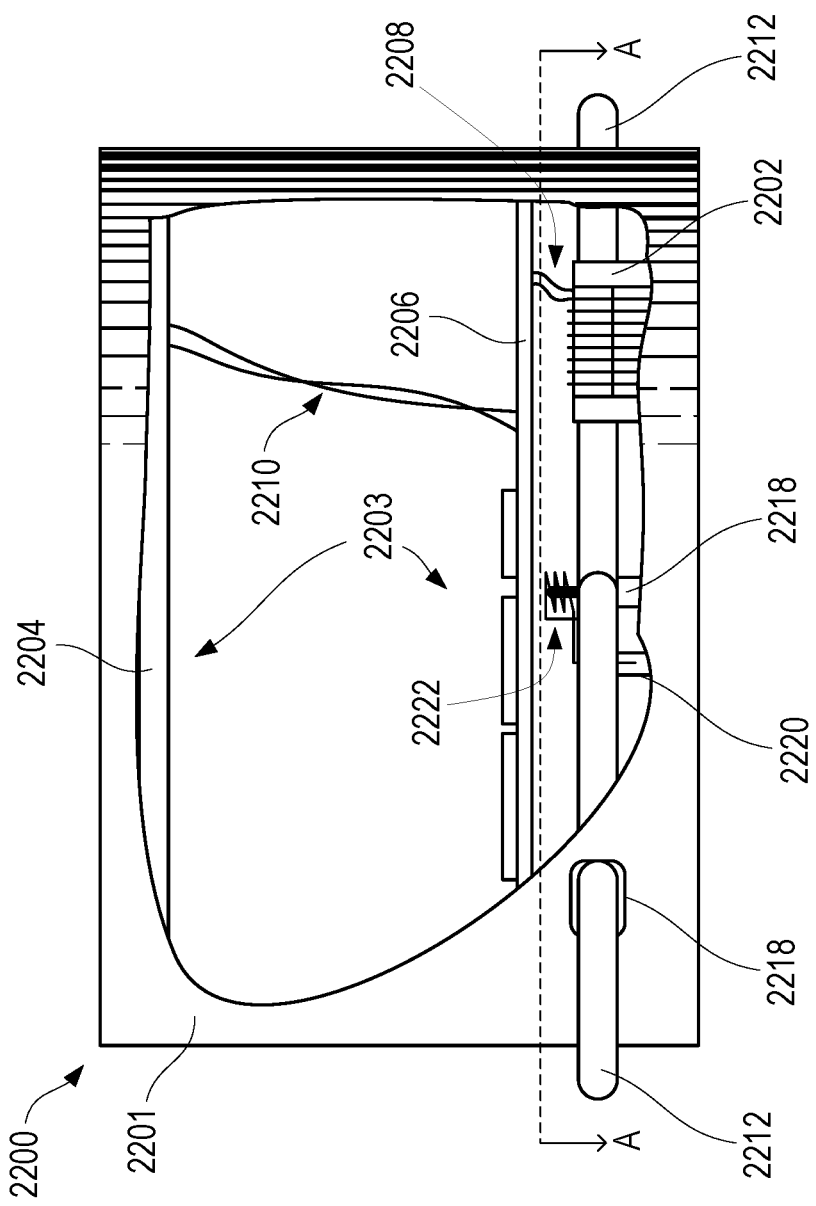
FIG. 22A illustrates a side cutaway view of an alternative configuration wireless power EPM locking pin in an extended state, in accordance with an example implementation.
Figure 22B:
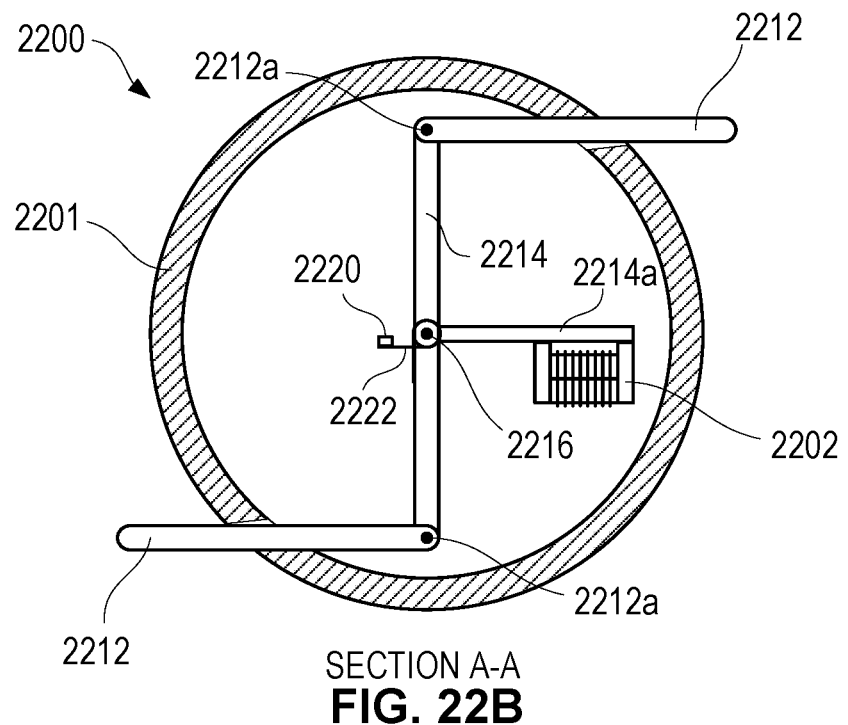
FIG. 22B illustrates a top section view of the wireless power EPM locking pin of FIG. 22A in an extended state, in accordance with an example implementation.
Figure 22C:
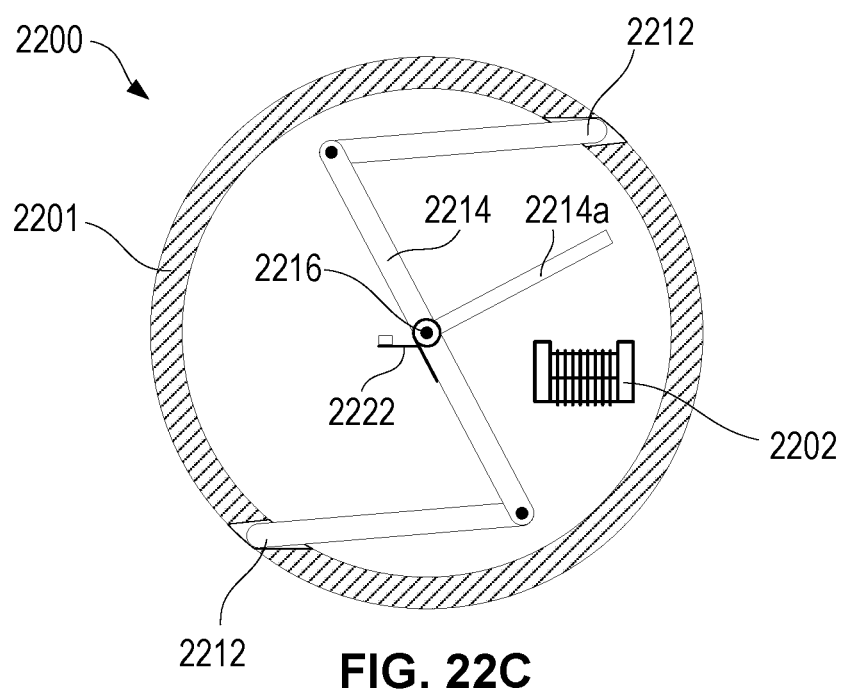
FIG. 22c illustrates a top section view of the wireless power EPM locking pin of FIG. 22A in a retracted state, in accordance with an example implementation.

FIGS. 22A through 22C illustrate an alternative configuration wireless power EPM locking pin, in accordance with an example implementation. FIG. 22A illustrates a side cutaway view of wireless power EPM locking pin 2200. FIGS. 22B and 22C illustrates a top section view of the wireless power EPM locking pin of FIG. 22A in an extended state and a retracted state, respectively.

Locking pin 2200 may have a case 2201 within which engagement pins 2212 may be located and through which the engagement pins 2212 may be extended beyond the outer dimensions of the case 2201 via apertures 2218. In some embodiments, the extended engagement pins 2212 may also be retracted back within the case 2201. The locking pin 2200 is illustrated with two engagement pins 2212, but may have more or fewer engagement pins 2212, and the engagements pins 2212 may not all be identical or symmetrically arranged as illustrated in FIGS. 22A through 22C.

The locking pin 2200 may include a wireless power EPM system. Locking pin 2200 illustrates an example embodiment of an EPM 2202 electrically coupled to a wireless power receiver system 2203 via leads 2208. The wireless power receiver system 2203 and components therein may be the same or similar to the wireless power receiver system 401 and components therein, including an induction coil 2204 connected to a circuit 2206 via leads 2210, where the circuit 2206 may include components described with respect to circuit 406 and/or additional components. Preferably the induction coil 2204 may be located near a user-accessible surface of the locking pin 2200 such that a wireless power transmitter system, such as EPM wand 500, may be placed in proximity to the induction coil 2204 for wireless power transfer.

EPM 2202 is illustrated as an EPM 202, but may take other forms, including but not limited to multiple EPMs 202. Preferably EPM 2202 is fixedly coupled within case 2201 to prevent movement of the EPM 2202. For example, EPM 2202 may be secured to an interior bottom side of case 2201 via adhesive or mechanical means. In FIG. 22C, EPM 2202 is shown in an OFF (or unactivated) state and in FIGS. 22A and 22B, EPM 2202 is shown in ON (or activated) state where it has attracted and coupled to a magnetic target 2214a. Magnetic target 2214a may be coupled to or part of rotating actuator 2214.

Rotating actuator 2214 may be coupled to the engagement pins 2212 via rotating joints 2212a. Rotating actuator 2214 may rest on a post 2218 and rotate about rotating joint 2216, which may be formed as a pin and hole. A spring, such as spring 2222, may be held between a stop 2220 and the rotating actuator 2214.

Spring 2222 may apply a retention force to the rotating actuator 2214 sufficient to retain the engagement pins 2212 in the retracted position when the EPM 2202 is in the OFF state and to allow the engagement pins 2212 to move from the retracted position in FIG. 22C to the extended position in FIG. 22B when the EPM 2202 is switched to the ON state. The retention force of spring 2222 may also be sufficient to return the engagement pins 2212 from the extended position to the retracted position when the EPM 2202 is switched from the ON state to the OFF state. The spring 222 is shown as a torsion spring, but may take other forms and be located at other positions within the case 2201.

Similar to or the same as with locking pin 1200, in operation, the locking pin 2200 may be inserted into an undercut blind hole or channel while the engagement pins 2212 are retracted. A wireless power transmitter, such as EPM wand 500, may be placed in proximity to locking pin 2200 and activated. Energy may then be wirelessly transmitted from the EPM wand 500 to the wireless power receiver 2203, which may then supply an electrical pulse to the EPM 2202 of sufficient power and duration to switch the magnetic state of the EPM 2202 from an OFF state to an ON state. In the ON state, the EPM 2202 may attract the magnetic target 2214a, causing the rotating actuator 2214 to rotate about the rotating joint 2216, which moves the engagement pins 2212 from the retracted position to the extended position. As a result, the locking pin 2200 may be secured within the blind hole or channel and the EPM wand 500 may be removed from proximity to the locking pin 2200.

To remove the locking pin 2200, the EPM wand 500 may again be placed in proximity to locking pin 2200 and activated so that the wireless power receiver 2203 supplies an electrical pulse to the EPM 2202 of sufficient power and duration to switch the magnetic state of the EPM 2202 to an OFF state. As previously described with respect to circuit 406, the circuit 2206 may contain circuitry capable of switching the polarity of the electrical pulse such that the wireless power transmitter may be used to both activate and deactivate the EPM 2202. The circuit 2206 may reverse the polarity of the electrical pulse each time the circuit 2206 is energized. In the OFF state, the EPM 2202 may no longer attract the magnetic target 2214a, thereby allowing engagement pins 2212 to retract and the locking pin 2200 to be removed from the hole or channel.

Figure 23:
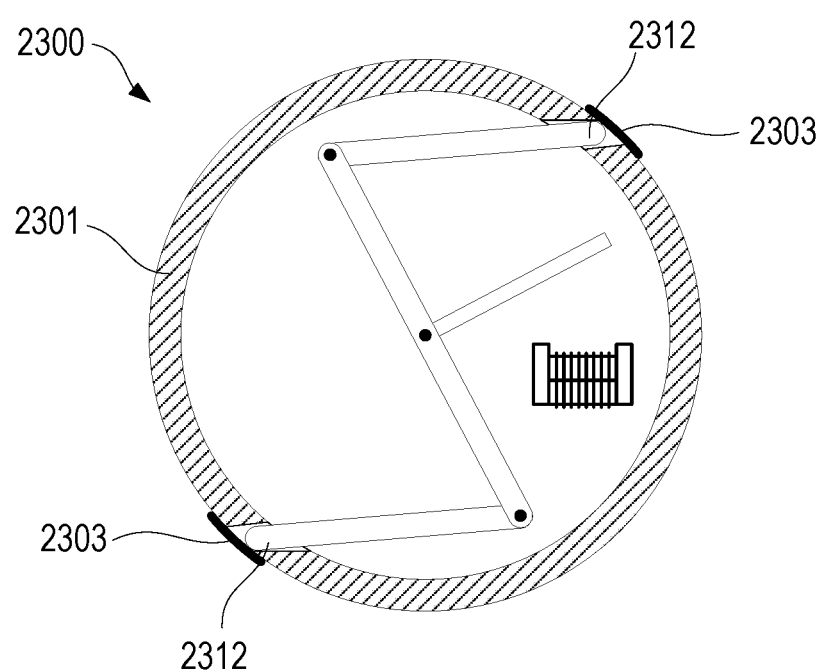
FIG. 23 illustrates a top cutaway view of an alternative configuration wireless power EPM locking pin in a retracted state, in accordance with an example implementation.

FIG. 23 illustrates a top cutaway view of an alternative configuration non-reversible wireless power EPM locking pin in a retracted state, in accordance with an example implementation. Locking pin 2300 may be the same or similar to locking pin 2200, with the following exceptions. Engagement pins 2312 may be held in the retracted state via tabs 2303. As a non-limiting example, the tabs 2303 may cover apertures through the case 2301 through which the engagement pins 2312 travel. The tabs 2303 may be formed from breakable adhesive paper or plastic. The tabs 2303 may be external, distinct, and discontinuous as shown, or may take other forms including a wrapping around the entire perimeter of the case 2301 or internal spring flexure tabs that apply a non-reversible force against the engagement pins.

IV. Conclusion

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A wireless power locking pin system comprising:
   a locking pin, wherein the locking pin comprises:
   a case,
   an electropermanent magnet electrically coupled to a wireless power receiver and configured to receive power from the wireless power receiver sufficient to switch a magnetic state of the electropermanent magnet between a first state and a second state, and
   an engagement pin contained within the case and configured to extend at least partially outside the case when the electropermanent magnet is switched from the first state to the second state.

2. The wireless power locking pin system of claim 1, wherein the first state is an OFF state and the second state is an ON state.

3. The wireless power locking pin system of claim 1, wherein the first state is an ON state and the second state is an OFF state.

4. The wireless power locking pin system of claim 1, further comprising:
 a handheld device comprising a human-operable switch and a wireless power transmitter, wherein the handheld device is configured to transmit wireless power to the wireless power receiver upon activation of the human-operable switch.

5. The wireless power locking pin system of claim 1, wherein the wireless power receiver further comprises a circuit configured to output a unidirectional current and reverse polarity of the unidirectional current each time the wireless power receiver is energized.

6. A wireless power locking pin system comprising:
 a locking pin case;
 a plunger comprising a magnetic target, an actuator comprising a first inclined surface, and a shaft coupling the magnetic target to the actuator;
 an engagement pin comprising a second inclined surface oriented to engage with the first inclined surface of the actuator, wherein the engagement pin is configured to move between a first position within the case and a second position wherein at least a portion of the engagement pin extends outside the case;
 a wireless power receiver, wherein the wireless power receiver is configured to receive energy from a wireless power transmitter and output a unidirectional electric current; and
 an electropermanent magnet electrically coupled to the wireless power receiver and configured to receive power from the wireless power receiver sufficient to switch a magnetic state of the electropermanent magnet between an OFF state and an ON state,
 wherein in the ON state the electropermanent magnet attracts the magnetic target, causing the first inclined surface of the actuator to slide along the second inclined surface of the engagement pin and move the engagement pin from the first position to the second position.

7. The wireless power locking pin system of claim 6, wherein the first inclined surface of the actuator is a conical surface.

8. The wireless power locking pin system of claim 6, further comprising a retention ring in communication with the engagement pin and configured to apply a retention force sufficient to retain the engagement pin in the first position when the electropermanent magnet is in the OFF state and to allow the engagement pin to move from the first position to the second position when the electropermanent magnet is in the ON state.

9. The wireless power locking pin system of claim 8, wherein the retention force is sufficient to return the engagement pin to the first position from the second position when the electropermanent magnet is switched from the ON state to the OFF state.

10. The wireless power locking pin system of claim 6, wherein the electropermanent magnet is a tubular electropermanent magnet.

11. The wireless power locking pin system of claim 10, wherein a plunger shaft is disposed through a hollow bore of the electropermanent magnet.

12. The wireless power locking pin system of claim 6, wherein the wireless power receiver further comprises a circuit configured to switch polarity of the output unidirectional electric current.

13. The wireless power locking pin system of claim 12, wherein the circuit switches the polarity of the output unidirectional electric current each time the circuit is energized.

14. The wireless power locking pin system of claim 6, further comprising:
 a handheld device comprising a human-operable switch and a wireless power transmitter, wherein the handheld device is configured to transmit wireless power to the wireless power receiver upon activation of the human-operable switch.

\* \* \* \* \*